United States Patent [19]

Osada et al.

[11] 4,127,553

[45] Nov. 28, 1978

[54] ELECTRICAL INSULATING RESIN COMPOSITION COMPRISING A POLYESTER RESIN OR ESTER-IMIDE RESIN

[75] Inventors: Yuichi Osada; Yasunori Okada; Shozo Kasai; Mineo Nakano; Shigeo Tachiki; Nobuyuki Hayashi; Masahiro Abo, all of Hitachi, Japan

[73] Assignee: Hitachi Chemical Company, Ltd., Tokyo, Japan

[21] Appl. No.: 788,769

[22] Filed: Apr. 19, 1977

[30] Foreign Application Priority Data

Apr. 20, 1976 [JP] Japan ................................. 51-46056
Mar. 29, 1977 [JP] Japan ................................. 52-36803
Mar. 31, 1977 [JP] Japan ................................. 52-37278

[51] Int. Cl.² .......................... C08K 5/06; C08G 63/68
[52] U.S. Cl. .......................... 260/33.2 R; 260/33.4 R; 528/296; 528/289; 528/186; 528/187; 528/190
[58] Field of Search .................... 260/75 N, 75 R, 76, 260/75 TN, 77, 33.2 R, 33.4 R

[56] References Cited

U.S. PATENT DOCUMENTS

| | | | |
|---|---|---|---|
| 3,382,203 | 5/1968 | Rating et al. ................... | 260/75 N X |
| 3,454,673 | 7/1969 | Schmidt et al. ................ | 260/75 N X |
| 3,562,219 | 2/1971 | Schmidt et al. ................ | 260/75 N X |
| 3,839,264 | 10/1974 | Schmidt et al. ................ | 260/75 N X |
| 3,922,252 | 11/1975 | Holub et al. .................... | 260/75 N |
| 3,929,714 | 12/1975 | Schmidt et al. ................ | 260/75 N X |

*Primary Examiner*—Lucille M. Phynes
*Attorney, Agent, or Firm*—Craig and Antonelli

[57] ABSTRACT

An electrical insulating resin composition comprising a resin obtained by reacting (a) one or more tri- or higher polyhydric alcohols and/or tri- or higher polybasic acids, (b) one or more dihydric alcohols, (c) one or more dibasic acids, (d) one or more monobasic acids containing one or more aromatic rings in the molecule, and/or (e) one or more monohydric alcohols containing one or more aromatic rings in the molecule, and if desired (f) one or more compounds containing or being able to form one or more 5-membered imide rings, can give high solids varnishes without lowering the molecular weight of the resin produced. Said varnishes can give coating films excellent in heat resistance, flexibility and mechanical strengths.

46 Claims, No Drawings

ELECTRICAL INSULATING RESIN COMPOSITION COMPRISING A POLYESTER RESIN OR ESTER-IMIDE RESIN

This invention relates to an electrical insulating resin composition comprising a polyester resin or ester-imide resin having low viscosity, low softening point and high solubility.

Recently release of solvents in paints and varnishes into the atmosphere has become serious problems to be solved immediately from various viewpoints such as public hazard, saving resources, and the like. The same problems have arisen in electrical insulating varnishes such as enamel varnishes. General purpose polyester type enamel varnishes presently use solvents having strong polarity such as cresol because of solubility of the resins. Further the solvents are used in the varnishes in large amounts, e.g., more than 50% in order to satisfy the conditions suitable for coating workability and coated film properties, since viscosity of the varnishes is required to be 100 poise or less at ordinary temperature, usually less than 70 – 80 poise at 30° C.

On the other hand, there has recently been put into practical use in very limited fields a so-called melt coating method, in which the amount of a solvent of the resin is reduced comparing with a conventional coating composition but viscosity of the coating composition is decreased to suitable one for coating work by preheating before the coating composition is applied for coating. But since there are many problems to be solved such as heating apparatus, heat stability of the varnishes, and the like, said method is not used practically completely.

Therefore, solvent type varnishes having low viscosity at ordinary temperature will be used mainly for a good while. But a naturally unnecessary amount of the solvent for forming coating films should be reduced as mentioned above.

In order to increase the resin content and to decrease the amount of a solvent used in a varnish, there have been proposed various methods for decreasing the molecular weight of the resins used, but it is also known that physical properties of the resulting cured films are considerably lowered, for example, in heat resistance, mechanical strengths, and the like. Therefore, novel methods other than decreasing the molecular weight of the resins have long been desired.

It is an object of this invention to provide a high solids electrical insulating resin composition having an increased resin content with the same or more excellent physical properties comparing with conventional ones without decreasing the molecular weight of the resin used.

This invention provides an electrical insulating resin composition comprising as a major component a resin obtained by reacting
(a) one or more tri- or higher polyhydric alcohols and/or tri- or higher polybasic acids,
(b) one or more dihydric alcohols,
(c) one or more dibasic acids,
(d) one or more monobasic acids containing one or more aromatic rings in the molecule, and/or
(e) one or more monohydric alcohols containing one or more aromatic rings in the molecule, and if desired,
(f) one or more compounds containing or being able to form one or more 5-membered imide rings.

The composition of this invention may further contain an organic solvent.

One embodiment of this invention is an electrical insulating resin composition comprising as a major component a saturated polyester resin having low softening point and high solubility obtained by reacting
(a) one or more tri- or higher polyhydric alcohols and/or tri- or higher polybasic acids,
(b) one or more dihydric alcohols,
(c) one or more dibasic acids,
(d) one or more monobasic acids containing one or more aromatic rings in the molecule, and/or
(e) one or more monohydric alcohols containing one or more aromatic rings in the molecule.

According to this invention, a varnish can contain the above-mentioned saturated polyester resin in more than 10 – 20% by weight higher than the resin content of conventional general purpose polyester type enamel varnishes without lowering physical properties of the film produced.

Examples of the tri- or higher polyhydric alcohols are trimethylolpropane, glycerin, tris(2-hydroxyethyl) isocyanurate, and the like.

Examples of the dihydric alcohols are ethylene glycol, propylene glycol, neopentyl glycol, and the like.

Examples of the tri- or higher polybasic acids or their esters, e.g., alkyl esters, are trimellitic anhydride, pyromellitic anhydride, and the like; trimethyl ester of trimellitic acid, and the like.

In this invention, the term "acid" includes the acid itself, the acid anhydride, and its esters.

Examples of the dibasic acids and their esters, e.g., alkyl esters, are terephthalic acid, isophthalic acid, phthalic anhydride, and the like; dimethyl terephthalate, dimethyl isophthalate, and the like.

Examples of the monobasic acids and their esters, e.g., alkyl esters, containing one or more aromatic rings in the molecule are benzoic acid, 2,3-dimethoxybenzoic acid, p-toluic acid, phenoxyacetic acid, 2-phenoxypropionic acid, phenylacetic acid, phenylpropionic acid, p-toluyl-o-benzoic acid, α-naphthylacetic acid, β-naphthoxyacetic acid, and the like; alkyl esters of the abovementioned acids such as methyl benzoate, and the like. In this invention, one or more of the dibasic acids, the monobasic acids containing one or more aromatic rings in the molecule and the tri- or higher polybasic acids may be reacted as esters such as alkyl esters, or alternatively all the acids may be reacted as the acid form.

Examples of the monohydric alcohols containing one or more aromatic rings in the molecule are benzyl alcohol, phenylethyl alcohol, and the like.

The reason of using the tri- or higher polyhydric alcohols and/or the tri- or higher polybasic acids in this invention is to produce nonlinear saturated polyester resins. Linear saturated polyester resins are not preferable in physical properties of the coating films.

In the case of producing the saturated polyester resin from the raw materials of (a), (b), (c) and (d), it is preferable to use the total alcohols, i.e. (b) the dihydric alcohol and (a) the tri- or higher polyhydric alcohol, in equivalent percent of 80 or less in terms of the excess percent of the hydroxyl group based on the total carboxylic acids or their esters, i.e. (c) the dibasic acid, (a) the tri- or higher polybasic acid and (d) the monobasic acid containing one or more aromatic rings in the molecule, or their esters. It is preferable to use 8 – 20 equivalent percent of the monobasic acid containing one or more aromatic rings in the molecule based on the total carboxylic acids, i.e. (d) the monobasic acid containing one or more aromatic rings in the molecule, (c) the dibasic acid and (a) the tri- or higher polybasic acid, or their esters.

In the case of producing the saturated polyester resin from the raw materials of (a), (b), (c) and (e), it is preferable to use the total alcohols, i.e. (b) the dihydric alcohol, (a) the tri- or higher polyhydric alcohol and (e) the monohydric alcohol containing one or more aromatic rings in the molecule, in equivalent percent of 50 or less in terms of the excess percent of the hydroxyl group based on the total carboxylic acids or their esters, i.e. (c) the dibasic acid and (a) the tri- or higher polybasic acid, or their esters. It is preferable to use 5 - 30 equivalent percent of the monohydric alcohol containing one or more aromatic rings in the molecule based on the hydroxyl groups of the total alcohols, i.e. (e) the monohydric alcohol containing one or more aromatic rings in the molecule, (b) the dihydric alcohol and (a) the tri- or higher polyhydric alcohol.

The same effects can be obtained in the combined use of the monobasic acid containing one or more aromatic rings in the molecule and the monohydric alcohol containing one or more aromatic rings in the molecule.

As the methods for charging the raw materials into the reaction system in the case of producing the saturated polyester resin from (a), (b), (c) and (d), the following ones may be employed:

(1) The monobasic acid containing one or more aromatic rings in the molecule and the dihydric alcohol, and if desired together with the tri- or higher polyhydric alcohol, are reacted first, and then the dibasic acid, and if desired together with the tri- or higher polybasic acid, is added and reacted.

(2) The dihydric alcohol, the dibasic acid, and the monobasic acid containing one or more aromatic rings in the molecule, and if desired together with the tri- or higher polyhydric alcohol and/or the tri- or higher polybasic acid, are added simultaneously and reacted.

(3) The dihydric alcohol, and the dibasic acid, and if desired together with the tri- or higher polybasic acid and/or the tri- or higher polyhydric alcohol are added first and reacted, and during the reaction, preferably the reaction percent being 50 or less, the monobasic acid containing one or more aromatic rings in the molecule is added and reacted.

(4) Combined methods of the above-mentioned methods (1), (2) and (3).

As the methods for charging the raw materials into the reaction system in the case of producing the saturated polyester resin from (a), (b), (c) and (e), the following ones may be employed:

(1) The monohydric alcohol containing one or more aromatic rings in the molecule, and the dibasic acid, and if desired together with the tri- or higher polybasic acid are added first and reacted, and then the dihydric alcohol, and if desired together with the tri- or higher polyhydric alcohol, is added and reacted.

(2) The monohydric alcohol containing one or more aromatic rings in the molecule, the dihydric alcohol, the dibasic acid, and the tri- or higher polyhydric alcohol, and if desired together with the tri- or high polybasic acid, are added simultaneously and reacted.

(3) The dihydric alcohol, the dibasic acid, and the tri- or higher polyhydric alcohol, and if desired the tri- or higher polybasic acid, are added first and reacted, and during the reaction, preferably the reaction percent being 50 or less, the monohydric alcohol containing one or more aromatic rings in the molecule is added and reacted.

(4) Combined methods of the above-mentioned methods (1), (2) and (3).

The reaction can be carried out, for example, by charging the raw materials in the proportions as mentioned above and the order as mentioned above, using as a catalyst di-n-butyl tin oxide, lead acetate or the like, heating at a temperature of preferably 150° - 240° C, and removing the water or alcohol generated during the condensation reaction out of the reaction system, until the average molecular weight of the produced resin becomes 800 - 2000, preferably 1200 - 1700, measured by GPC analysis, practically by acid value or viscosity.

The thus obtained saturated polyester resin has remarkably lower softening point than the conventional polyester resin used for electrical insulation. Particularly, when phenylacetic acid or phenylpropionic acid is used as the monobasic acid containing one or more aromatic rings in the molecule, or when benzyl alcohol is used as the monohydric alcohol containing one or more aromatic rings in the molecule, the softening point becomes 50° C or less.

In this respect, when the composition of this invention is used as an electrical insulating varnish, for example, for coating electric wires, it is possible to perform hot melt coating at relatively lower temperatures than the conventional method when used as a solvent-free varnish, and it is also possible to reduce the amount of a solvent when used as a solvent type varnish due to high solubility. For example, in order to obtain the viscosity of 70 poise at 30° C, the resin content can be raised up to 70 - 75% by weight using Cellosolve Acetate as a solvent.

In this invention, to the saturated polyester resin, conventional additives such as solvent, a curing agent, a surface smoothing agent, and the like can be added.

As the solvents, there may be used cresol, Cellosolve Acetate, glycol ethers, alcohol derivatives, and the like.

When the saturated polyester resin is dissolved in a glycol ether represented by the formula, $$R_1O(CHR_2CH_2O)_nH \qquad (I)$$

wherein $R_1$ is a lower alkyl group; $R_2$ is a hydrogen atom or a methyl group; and n is an integer of 1 to 3, or an alcohol derivative represented by the formula, $$R_4O(CHR_2CH_2O)_nCOR_3 \qquad (II)$$

wherein $R_3$ and $R_4$ are independently a lower alkyl group, an aryl group or an aralkyl group; and $R_2$ and n are as defined above, there can be obtained a varnish having higher content of nonvolatile material than a conventional varnish at the same viscosity. The above-mentioned glycol ether and alcohol derivative can be used together.

Examples of the glycol ethers are ethylene glycol monomethyl ether, diethylene glycol monomethyl ether, diethylene glycol monoethyl ether, diethylene glycol monoisopropyl ether, diethylene glycol monobutyl ether, dipropylene glycol monomethyl ether, and the like.

Examples of the alcohol derivatives are ethylene glycol monomethyl ether acetate (Cellosolve Acetate), ethylene glycol monoethyl ether acetate, ethylene glycol monoisopropyl ether acetate, ethylene glycol monobutyl ether acetate, propylene glycol monomethyl ether acetate, and the like.

When the saturated polyester resin used in this invention is used as an enamel varnish, a solvent, and a small amount of curing agent such as tetrabutyl titanate (hereinafter referred to as "TBT"), or the like, a surface smoothing agent such as zinc napthenate, zinc octoate, or the like are added thereto.

The high solids polyester varnishes thus produced can be cured at a high temperature in a short time to give crosslinked polyester resins or coating films excellent in heat resistance, flexibility, mechanical strengths, and the like.

The following examples will serve to explain this invention.

In the following examples, Comparative Examples 1 and 2 show a process for producing a conventional polyester resin varnish and a process for producing a polyester resin varnish wherein the molecular weight of the polyester resin is lowered in order to increase the resin content in the varnish. In Table 2, there are shown physical properties of the cured films obtained from the varnishes of Examples 1 to 7 as well as Comparative Examples 1 and 2 for comparison.

Comparative Example 1

Into a flask equipped with a stirrer, a thermometer and a cooling tube for fractional distillation, 137 g of ethylene glycol, 90 g glycerin, 500 g of terephthalic acid, and 3 g of di-n-butyl tin oxide were charged. The flask was heated with a mantle heater. The contents of the flask were heated up to 185° C - 240° C in 8 hours with stirring and the reaction was continued while removing the water generated during the reaction out of the reaction system by distillation. When the acid value became 20 or less, the reaction was stopped and the reaction system was cooled. The polyester produced had an average molecular weight of 1650. To the resin, 760 g of m-cresol, 25 g of TBT and 8 g of zinc naphthenate were added to produce a varnish. Viscosity of the varnish at 30° C was 70 poise. The resin content in the varnish was 39.5% by weight when measured the weight ratio before and after the heat treatment of the varnish at 200° C for 2 hours.

Comparative Example 2

The reaction of Comparative Example 1 was repeated except for using 154 g of ethylene glycol, 125 g of glycerin, 500 g of terephthalic acid and 4 g of di-n-butyl tin oxide, and the reaction was stopped when the acid value became 40 or less, followed by cooling of the reaction system. The polyester produced had an average molecular weight of 700. To the resin, 330 g of Cellosolve Acetate, 27 g of TBT and 9 g of zinc napthenate were added to produce a varnish. Viscosity of the varnish at 30° C was 70 poise. The resin content in the varnish was 62% by weight when measured the weight ratio of before and after the heat treatment of the varnish at 200° C for 2 hours.

Examples 1 - 5

In a flask equipped with a stirrer, a thermometer and a cooling tube for fractional distillation, all the raw materials as listed in Table 1 were placed and the flask was heated with a mantle heater. The contents of the flask were heated to 175° C - 225° C in 8 hours to carry out the esterification reaction, while removing the water generated during the reaction out of the reaction system by distillation, and the reaction was continued at 225° C. When the acid value became the value as listed in Table 1, the reaction was stopped and the reaction system was cooled. Average molecular weights and softening points of the polyesters produced were listed in Table 1.

To these polyester resins, Cellosolve Acetate as a solvent, TBT as a curing agent, and zinc naphthenate as a surface smoothing agent were added to give varnishes as listed in Table 1 and viscosities of the varnishes were adjusted with Cellosolve Acetate to 70 poise at 30° C.

Table 1

| | | | Example 1 | Example 2 | Example 3 | Example 4 | Example 5 |
|---|---|---|---|---|---|---|---|
| Raw materials for producing polyesters | Ethylene glycol | (g) | 182 | 187 | 214 | 187 | 204 |
| | Neopentyl glycol | (g) | 76 | 78 | 90 | 78 | — |
| | Glycerine | (g) | 120 | 174 | 198 | 238 | 135 |
| | Trimethylolpropane | (g) | — | 60 | 68 | — | — |
| | Tris(2-hydroxyethyl) isocyanurate | (g) | 71 | 55 | 63 | — | — |
| | Terephthalic acid | (g) | 490 | 735 | 735 | 805 | 441 |
| | Isophthalic acid | (g) | 48 | 72 | 72 | — | 43 |
| | Trimellitic anhydride | (g) | 46 | 69 | 69 | 70 | 40 |
| | Name Monobasic acid | | α,β-Dimethoxy- | 2-Phenoxybenzoic acid | 3-Phenylpropionic acid | Phenylpropionic acid | 3-Phenylacetic acid propionic |
| | | (g) | 180 | 215 | 225 | 168 | 135 |
| | Di-n-butyl tin oxide | (g) | 6 | 8 | 8 | 7 | 5 |
| Properties of polyesters | Acid value | | <3 | <15 | <7 | <10 | <4 |
| | Average mol. weight | | 1600 | 1800 | 1650 | 1600 | 1200 |
| | Softening point (° C) | | 56 | 63 | 46 | 50 | 48 |
| Curing agent | TBT | (g) | 48 | 57 | 50 | 53 | 40 |
| Smoothing agent | Zinc naphthenate | (g) | 15 | 18 | 11 | 13 | 15 |
| Solvent | Cellosolve Acetate | (g)*1 | 450 | 770 | 380 | 560 | 355 |
| Resin content | | (%)*2 | 62 | 57 | 73 | 66 | 70 |

Table 1-continued

|  | Example 1 | Example 2 | Example 3 | Example 4 | Example 5 |
|---|---|---|---|---|---|
| in the varnish |  |  |  |  |  |

Note)
*1: The amount required for adjusting the viscosity of varnish to 70 poise at 30° C.
*2: Calculated from the weight ratio of before and after the heat treatment of the varnish at 200° C for 2 hours.

Example 6

In a flask equipped with a stirrer, a thermometer and a cooling tube for fractional distillation, 102 g of ethylene glycol, 67 g of glycerin, 67 g of 3-phenylpropionic acid and 2 g of di-n-butyl tin oxide were placed and the flask was heated with a mantle heater gradually. The contents of the flask were reacted at 175° C - 190° C for 3 hours while removing the water produced from the reaction system by distillation. When the acid value became 2 or less, the reaction system was cooled to 140° C and 220 g of terephthalic acid, 21 g of isophthalic acid and 20 g of trimellitic anhydride were added to the flask. Then the flask was heated again with the mantle heater to 175° C - 225° C in 7 hours, while carrying out the esterification reaction and removing the water generated from the reaction system by distillation. The reaction was continued at 225° C until the acid value became 4 or less. Then the reaction was stopped and the reaction system was cooled. Average molecular weight of the polyester produced was 1200. Softening point was 49° C. The resin was dissolved in 140 g of Cellosolve Acetate and 18 g of TBT and 4 g of zinc naphthenate were added thereto to produce a varnish. The resin content in the varnish was 69% by weight when measured the weight ratio of before and after the heat treatment of the varnish at 200° C for 2 hours.

Example 7

In a flask equipped with a stirrer, a thermometer and a cooling tube for fractional distillation, 85 g of ethylene glycol, 84 g of glycerin, 220 g terephthalic acid, 21 g of isophthalic acid, 20 g of trimellitic anhydride and 3 g of di-n-butyl tin oxide were placed and the flask was heated with a mantle heater gradually. The contents of the flask were reacted at 175° C - 195° C for 4 hours while removing the water generated from the reaction system by distillation. When the water distilled became 33 ml, the reaction system was cooled to 140° C and 60 g of phenylacetic acid was added to the flask. Then the flask was heated again with the mantle heater to 185° C - 225° C in 5 hours, while carrying out the esterification reaction and removing the water generated from the reaction system by distillation. The reaction was continued at 225° C until the acid value became 4 or less. Then the reaction was stopped and the reaction system was cooled. The polyester produced had an average molecular weight of 1300 and a softening point of 52° C. The resin was dissolved in 157 g of Cellosolve Acetate and 20 g of TBT and 5 g of zinc naphthenate were added thereto to produce a varnish. The resin content in the varnish was 64% by weight when measured the weight ratio of before and after the heat treatment of the varnish at 200° C for 2 hours.

Example 8

The reaction of Example 7 was repeated and the reaction was stopped when the acid value became 10 or less. The resin was dissolved in 300 g of diethylene glycol monisopropyl ether and 20 g of TBT and 5 g of zinc naphthenate were added thereto to produce a varnish. The resin content in the varnish was 56% by weight when measured the weight ratio of before and after the heat treatment of the varnish at 200° C for 2 hours.

Physical properties of cured films

The varnishes obtained in Examples 1 - 7 and Comparative Examples 1 and 2 were coated on copper plates uniformly in thickness of 50 μ and heated at 200° C for 30 minutes. Physical properties of the cured films were measured with the results as shown in Table 2.

Table 2

| Varnish | Average mol. wt. of polyester | Resin*5 content (%) | Gel time (sec.) (220° C) | Strength of film (Pencil hardness) | Alkali*1 resistance | Adhesion*2 | Temperature*3 at beginning of weight loss (° C) |
|---|---|---|---|---|---|---|---|
| Com. Example 1 | 1650 | 39.5*4 | 100 | 5H | No change after 72 hrs. | Excellent | 305 |
| Com. Example 2 | 700 | 62 | 221 | 4H | Changed after 24 hrs. | Good | 247 |
| Example 1 | 1600 | 62 | 155 | 5H | No change after 72 hrs. | Excellent | 301 |
| Example 2 | 1800 | 57 | 148 | " | " | " | 316 |
| Example 3 | 1650 | 73 | 150 | " | " | " | 308 |
| Example 4 | 1600 | 66 | 161 | " | " | " | 310 |
| Example 5 | 1200 | 70 | 183 | " | " | " | 305 |
| Example 6 | 1200 | 69 | 191 | " | " | " | 302 |
| Example 7 | 1300 | 64 | 195 | " | " | " | 308 |

Note)
*1: Judged by decrease of pencil hardness after immeresed in a 5% NaOH aqueous solution.
*2: Cross cut test on the copper plate. Excellent: no peeling, Good: slightly peeled.
*3: The film was stripped from the copper plate and ground into powder, which was analyzed by a thermobalance. The temperature at which weight loss begins was read from the graph.
*4: Using cresol as a solvent, viscosity of the varnish was adjusted to 70 poise at 30° C.
*5: Using Cellosolve Acetate as a solvent, viscosity of the varnish was adjusted to 70 poise at 30° C.

As is clear from Table 2, when the varnish in which the average molecular weight of the resin was lowered in order to increase the resin content in the varnish is used (Comparative Example 2), all the physical properties of the cured film are inferior to those of Comparative Example 1.

On the other hand, when the varnishes in which the resin content in the varnishes was raised without lowering the molecular weight of the resins in accordance with this invention are used, all the physical properties of the cured films, i.e. strength of film, alkali resistance, adhesion, and temperature at beginning of weight loss, are the same as those of Comparative Example 1. Gel times of the varnishes of Examples 1 - 7 are slightly slower than that of Comparative Example 1, but these are immaterial.

Examples 9 - 11

In a flask equipped with a stirrer, a thermometer and a cooling tube for fractional distillation, all the raw materials as listed in Table 3 were placed and the flask was heated with a mantle heater. The contents of the flask were heated to 175° C - 225° C in 8 hours to carry out the esterification reaction, while removing the water generated during the reaction from the reaction system by distillation, and the reaction was continued at 225° C. When the acid value became the value as listed in Table 3, the reaction was stopped annd the reaction system was cooled. Averabge molecular weights and softening points of the polyesters produced were listed in Table 3.

To these polyester resins, Cellosolve Acetate as a solvent, TBT as a curing agent, and zinc naphthenate as a surface smoothing agent were added to give varnishes as listed in Table 3 and viscosities of the varnishes were adjusted with Cellosolve Acetate to 70 poise at 30° C.

lation. When the water distilled became more than 10 ml, the reaction system was cooled to 140° C and 61 g of ethylene glycol and 60 g of glycerin were added to the flask. Then the flask was heated again with the mantle heater to 180° C - 225° C in 6 hours, while carrying out the esterification reaction and removing the water generated from the reaction system by distillation. The reaction was continued at 225° C until the acid value became 7 or less. Then the reaction was stopped and the reaction system was cooled. The polyester produced had an average molecular weight of 1400 and a softening point of 58° C. The resin was dissolved in 161 g of Cellosolve Acetate, and 16 g of TBT and 4 g of zinc naphthenate were added thereto to produce a varnish. The resin content in the varnish was 65% by weight when measured the weight ratio of before and after heat treatment of the varnish at 200° C for 2 hours.

Example 13

The reaction of Example 9 was repeated and the resin produced was dissolved in 210 g of diethylene glycol monoisopropyl ether, and 18 g of TBT and 6 g of zinc naphthenate were added thereto to produce a varnish. The resin content in the varnish was 58% by weight when measured the weight ratio of before and after the heat treatment of the varnish at 200° C for 2 hours.

Table 3

|  |  |  | Example 9 | Example 10 | Example 11 |
|---|---|---|---|---|---|
|  | Ethylene glycol | (g) | 75 | 140 | 59 |
|  | Glycerin | (g) | 74 | 140 | 57 |
| Raw materials | Terephthalic acid | (g) | 235 | 470 | 235 |
| for producing | Isophthalic acid | (g) | 23 | 44 | 22 |
| polyesters | Trimellitic anhydride | (g) | 22 | 41 | 21 |
|  | Monohydric | Name | Benzyl alcohol | Benzyl alcohol | Phenylethyl alcohol |
|  | alcohol | (g) | 55 | 140 | 80 |
|  | Di-n-butyl tin oxide | (g) | 2 | 5 | 2 |
| Properties | Acid value |  | 8 | 7 | 5 |
| of | Average mol. weight |  | 1400 | 1500 | 1800 |
| polyesters | Softening point | (° C) | 44 | 48 | 60 |
| Curing agent | TBT | (g) | 18 | 40 | 20 |
| Smoothing |  |  |  |  |  |
| agent | Zinc naphthenate | (g) | 6 | 15 | 7 |
| Solvent | Cellosolve Acetate | (g)*1 | 105 | 250 | 174 |
| Resin content in the varnish |  | (%)*2 | 73 | 71 | 63 |

Note)
*1: The amount required for adjusting the viscosity of varnish to 70 poise at 30° C.
*2: Calculated from the weight ratio of before and after the heat treatment of the varnish at 200° C for 2 hours.

Example 12

In a flask equipped with a stirrer, a thermometer and a cooling tube for fractional distillation, 286 g of terephthalic acid, 75 g of benzyl alcohol, and 2 g of di-n-butyl tin oxide were placed and the flask was heated with a mantle heater gradually. The contents of the flask were reacted at 180° C - 210° C for 3 hours while removing the water generated from the reaction system by distil- Physical properties of cured films The varnishes obtained in Examples 9 - 12 were coated on copper plates uniformly in thickness of 50 μ and heated at 200° C for 30 minutes. Physical properties of the cured films were measured with the results as shown in Table 4. For reference, the results of Comparative Examples 1 and 2 are also listed in Table 4.

Table 4

| Varnish | Average mol. wt. of polyester | Resin*5 content (%) | Gel time (sec.) (220° C) | Strength of film (Pencil hardness) | Alkali*1 resistance | Adhesion*2 | Temperature *3 at beginning of weight loss (° C) |
|---|---|---|---|---|---|---|---|
| Comparative Example 1 | 1650 | 39.5*4 | 100 | 5H | No change after 72 hrs. | Excellent | 305 |
| Comparative Example 2 | 700 | 62 | 221 | 4H | Changed after 24 hrs. | Good | 247 |
| Example 9 | 1400 | 73 | 173 | 5H | No change after 72 hrs. | Excellent | 298 |
| Example 10 | 1500 | 71 | 161 | " | " | " | 301 |
| Example 11 | 1800 | 63 | 143 | " | " | " | 317 |

Table 4-continued

| Varnish | Average mol. wt. of polyester | Resin[5] content (%) | Gel time (sec.) (220°C) | Strength of film (Pencil hardness) | Alkali[1] resistance | Adhesion[2] | Temperature[3] at beginning of weight loss (°C) |
|---|---|---|---|---|---|---|---|
| Example 12 | 1400 | 65 | 170 | " | " | " | 301 |

Note)
[1]: Judged by decrease of pencil hardness after immersed in a 5% NaOH aqueous solution.
[2]: Cross cut test on the copper plate. Excellent: no peeling, Good: slightly peeled.
[3]: The film was stripped from the copper plate and ground into powder, which was analyzed by a thermobalance. The temperature at which weight loss begins was read from the graph.
[4]: Using cresol as a solvent, viscosity of the varnish was adjusted to 70 poise at 30°C.
[5]: Using Cellosolve Acetate as a solvent, viscosity of the varnish was adjusted to 70 poise at 30°C.

As is clear from Table 4, when the varnish in which the average molecular weight of the resin was lowered in order to increase the resin content in the varnish is used (Comparative Example 2), all the physical properties of the cured film are inferior to those of Comparative Example 1.

On the other hand, the varnishes in which the resin content in the varnishes was raised without lowering the molecular weight of the resins in accordance with this invention are used, all the physical properties of the cured films, i.e. strength of film, alkali resistance, adhesion and temperature at beginning of weight loss, are the same as those of comparative Example 1. Gel times of the varnishes of Examples 9 - 12 are slightly slower than that of Comparative Example 1, but these are immaterial.

Another embodiment of this invention is an electrical insulating resin composition comprising as a major component a resin (an ester-imide resin) having low viscosity and excellent solubility obtained by reacting
(a) one or more tri- or higher polyhydric alcohols and/or tri- or higher polybasic acids,
(b) one or more dihydric alcohols,
(c) one or more dibasic acids,
(d) one or more monobasic acids containing one or more aromatic rings in the molecule, and/or
(e) one or more monohydric alcohols containing one or more aromatic rings in the molecule, and
(f) one or more compounds containing or being able to form one or more 5-membered imide rings.

According to this invention, a varnish can contain the resin in more than 10 - 20% by weight higher than the resin content of conventional esterimide type enamel varnishes without lowering physical properties of the film produced.

As the tri- or higher polyhydric alcohols, the tri- or higher polybasic acids, the dihydric alcohols, the dibasic acids, the monobasic acids containing one or more aromatic rings in the molecule, and the monohydric alcohol containing one or more aromatic rings in the molecule, those mentioned above in the case of producing the saturated polyester resins can be used.

As the compounds containing or being able to form one or more 5-membered imide rings, those having one or more 5-membered imide rings obtained by reacting a polybasic acid anhydride or the like, with a primary diamine such as diaminodiphenylmethane, metaphenylenediamine, of the like, an amino alcohol such as ethanolamine, or the like, or an aminocarboxylic acid such as aminoacetic acid, aminohexanoic acid, or the like can be used. In addition, a mixture of the above-mentioned polybasic acid anhydride, which may be mixed with the other raw materials, and a primary diamine, an amino alcohol, an aminocarboxylic acid or the like may be used. For example, about 1 mole of the primary diamine per 2 moles of the tribasic acid anhydride, about 1 mole of the amino alcohol per mole of the tribasic acid anhydride, about 1 mole of the aminocarboxylic acid per mole of the tribasic acid anhydride, about 1 mole of the primary diamine per 2 moles of the tetrabasic acid dianhydride, about 2 moles of the aminocarboxylic acid per mole of the tetrabasic acid dianhydride can be used.

In the production of the esterimide resin, the compound containing or being able to form one or more 5-membered imide rings can be used either as a compound containing one or more 5-membered imide rings previously formed, or as a compound being able to form one or more 5-membered imide rings, which are mixed with the other raw materials and reacted to form the 5-membered imide ring. Therefore, in the practical reaction for producing the esterimide resin, the 5-membered imido ring can be formed first and then the other raw materials are added thereto to carry out the reaction, or alternatively all the raw materials can be reacted at the same time.

The reason of using the tri- or higher polyhydric alcohols and/or the tri- or higher polybasic acids in this invention is to produce nonlinear saturated polyesterimide resins. Linear saturated polyesterimide resins are not preferable in physical properties of the coating films. When tris(2-hydroxyethyl) isocyanurate is used as the tri- or higher polyhydric alcohol, excellent heat resistance can be obtained.

It is preferable to use 35 or more equivalent percent of the tri- or higher polyhydric alcohol based on the total alcohols from viewpoints of physical properties of the film formed and solubility to a solvent. If the amount of the tri- or higher polyhydric alcohol is less than 35 equivalent percent based on the total alcohols, solubility of the esterimide resin decreases and stability of the varnish also decreases, there being not preferable.

The amount of the monobasic acid containing one or more aromatic rings in the molecule is preferably 8 - 20 equivalent percent based on the total carboxylic acids from viewpoints of heat resistance and solubility to a solvent.

It is preferable to use 5 - 30 equivalent percent of the monohydric alcohol containing one or more aromatic rings in the molecule based on the total alcohols. If the monohydric alcohol is less than 5 equivalent percent, the properties of low viscosity with high solubility cannot be shown clearly, while if more than 30 equivalent percent, crosslinking density decreases and heat resistance decreases.

The same effects can be obtained in the combined use of the monobasic acid containing one or more aromatic rings in the molecule and the monohydric alcohol containing one or more aromatic rings in the molecule.

The esterimide resin used in this invention can be obtained by the reaction of the raw materials (a), (b), (c), (d) and/or (e) and (f) without using a solvent or in the presence of a solvent, for example about 10% by weight of the solvent, such as cresol, phenol, N-methylpyrrolidone, or the like. The reaction temperature is preferably 150° - 240° C.

When the esterimide resin produced is dissolved in a conventional solvent such as phenol, cresol, xylene or the like, there can be obtained a varnish having about 10% by weight of nonvolatile material higher than a conventional varnish containing a conventional esterimide resin, which has almost the same molecular weight but does not contain the monohydric alcohol containing one or more aromatic rings in the molecule, at the same viscosity.

Further when the esterimide resin used in this invention is dissolved in a glycol ether of the formula (I), $R_1O(CHR_2CH_2O)_nH$, wherein $R_1$, $R_2$ and n are as defined above, and/or an alcohol derivative of the formula (II), $R_4O(CHR_2CH_2O)_nCOR_3$, wherein $R_2$, $R_3$, $R_4$ and n are as defined above, there can be obtained a varnish having more higher content of nonvolatile material than the former case at the same viscosity.

When the esterimide resin used in this invention is practically used as an enamel varnish, a solvent, and a small amount of curing agent such as TBT or the like, a surface smoothing agent such as zinc naphthenate, zinc octoate or the like are added thereto.

The high solids esterimide varnishes thus produced can be cured at a high temperature in a short time to give crosslinked esterimide resins or coating films excellent in heat resistance, flexibility, mechanical strengths, and the like.

The following examples will serve to explain this invention.

In the following examples, Comparative Examples 3 and 4 show a process for producing a conventional esterimide resin varnish and a process for producing an esterimide resin varnish wherein the molecular weight of the esterimide resin is lowered in order to increase the resin content in the varnish.

Comparative Example 3

In a flask equipped with a stirrer, a thermometer, and a cooling tube for fractional distillation, 83.7 g of ethylene glycol, 156.6 g of tris(2-hydroxyethyl) isocyanurate, 199.2 g of terephthalic acid, 57.6 g of trimellitic anhydride, 29.7 g of diaminodiphenylmethane, 24.9 g of isophthalic acid, 66.7 g of meta-cresol, and 0.6 g of TBT as a catalyst were placed and the flask was heated with a mantle heater. The contents of the flask were heated with stirring to 185° C - 230° C in 8 hours and the reaction was continued while removing the water generated during the reaction from the reaction system by distillation. when the acid value became 20 or less, the reaction was stopped and the reaction system was cooled. The esterimide resin produced had an average molecular weight of 2000. To the resin, 730 g of meta-cresol, 16.5 g of TBT, and 5.5 g of zinc naphthenate were added to produce a varnish. Viscosity of the varnish at 30° C was 65 poise. The resin content in the varnish was 37.5% by weight when measured the weight ratio of before and after the heat treatment of the varnish at 200° C for 2 hours.

Comparative Example 4

The reaction of Comparative Example 3 was repeated and the reaction was stopped when the acid value became 40 or less. Then the reaction system was cooled. The esterimide resin produced had an average molecular weight of 900. To the resin, 480 g of meta-cresol, 16.5 g of TBT and 5.5 g of zinc naphthenate were added to produce a varnish. Viscosity of the varnish at 30° C was 62 poise. The resin content in the varnish was 47.2% by weight when measured the weight ratio of before and after the heat treatment of the varnish at 200° C for 2 hours.

EXAMPLE 14

The reaction was carried out in the same manner as described in Comparative Example 3 except for using 207.0 g of ethylene glycol, 470.0 g of tris(2-hydroxyethyl) isocyanurate, 597.6 g of terephthalic acid, 172.8 g of trimellitic anhydride, 89.1 g of diaminodiphenylmethane, 74.7 g of isophthalic acid, 154.4 g of benzyl alcohol, and 202.0 g of meta-cresol. The reaction was stopped when the acid value became 8 by stopping heating.

600 Grams of the resin produced was taken out and 444 g of meta-cresol, 15.7 g of TBT and 5.3 g of zinc naphthenate were added thereto to produce a varnish. Viscosity of the varnish was 57 poise at 30° C. The resin content in the varnish was 47.7% by weight when measured the weight ratio of before and after the heat treatment of the varnish at 200° C for 2 hours. Average molecular weight of the resin produced was 1800.

EXAMPLE 15

To 600 g of the resin produced in Example 14, 248 g of diethylene glycol monoisopropyl ether, 15.7 g of TBT, and 5.3 g of zinc naphthenate were added to produce a varnish. Viscosity of the varnish was 59 poise at 30° C. The resin content in the varnish was 57.6% by weight when measured the weight ratio of before and after the heat treatment of the varnish at 200° C for 2 hours.

On the other hand, the resin obtained in Comparative Example 3 was not dissolved in diethylene glycol monoisopropyl ether and formed white cloudy precipitate.

EXAMPLE 16

To 600 g of the resin produced in Example 14, 107 g of diethylene glycol monoisopropyl ether, 107 g of Cellosolve Acetate, 15.7 g of TBT and 5.3 g of zinc naphthenate were added to produce a varnish. Viscosity of the varnish was 64 poise at 30° C. The resin content in the varnish was 62.5% by weight when measured the weight ratio of before and after the heat treatment of the varnish at 200° C for 2 hours.

EXAMPLE 17

The reaction was carried out in the same manner as described in Comparative Example 3 except for using 75 g of ethylene glycol, 74 g of glycerin, 211 g of terephthalic acid, 23 g of isophthalic acid, 28 g of diaminodiphenylmethane, 77 g of trimellitic anhydride, 28 g of benzyl alcohol, and 2 g of di-n-butyl tin oxide as a catalyst. The reaction was stopped when the acid value became 10 by stopping heating. The esterimide resin obtained had an average molecular weight of 1900. To the resin, 110 g of Cellosolve Acetate, 18 g of TBT and 6 g of zinc naphthenate were added to produce a varnish. Viscosity of the varnish was 72 poise at 30° C. The resin content in the varnish was 64.1% by weight when measured the weight ratio of before and after the heat treatment of the varnish at 200° C for 2 hours.

EXAMPLE 18

The reaction was carried out in the same manner as described in Comparative Example 3 except for using 59 g of ethylene glycol, 57 g of glycerin, 212 g of terephthalic acid, 22 g of isophthalic acid, 30 g of diaminodiphenylmethane, 82 g of trimellitic anhydride, 80 g of phenylethyl alcohol and 2 g of di-n-butyl tin oxide as a catalyst. The reaction was stopped when the acid value became 8 by stopping heating. The esterimide resin obtained had an average molecular weight of 2000. To the resin, 180 g of Cellosolve Acetate, 20 g of TBT and 7 g of zinc naphthenate were added to produce a varnish. Viscosity of the varnish was 69 poise at 30° C. The resin content in the varnish was 60.0% by weight when measured the weight ratio of before and after the heat treatment of the varnish at 200° C for 2 hours.

Example 19

In a flask equipped with a stirrer, a thermometer and a cooling tube for fractional distillation, 29.7 g of diaminodiphenylmethane, 57.6 g of trimellitic anhydride and 67.3 g of meta-cresol were placed and 0.6 g of TBT as a catalyst was added to the flask. The flask was heated with a mantle heater to 200° C with stirring, while removing the water generated out of the reaction system. After maintaining the temperature at 200° C for 2 hours, 199.2 g of terephthalic acid, 24.9 g of isophthalic acid, 51.5 g of benzyl alcohol, 69.0 g of ethylene glycol and 156.7 g of tris(2-hydroxyethyl) isocyanurate were added to the flask. The temperature was raised from 185° C to 230° C in 6 hours with heating, while removing the water generated during the reaction out of the reaction system by distillation. The reaction was continued until the acid value became 12 and the heating was stopped. The resin obtained had an average molecular weight of 1900. To the resin, 140 g of meta-cresol, 15.0 g of TBT and 5.1 g of zinc naphthenate were added to produce a varnish. Viscosity of the varnish was 72 poise at 30° C. The resin content in the varnish was 48.1% by weight when measured the weight ratio of before and after the heat treatment of the varnish at 200° C for 2 hours.

When the varnishes obtained in Examples 14 - 19 were coated on copper plates and heated at 200° C for 2 hours, there were obtained tough films.

EXAMPLE 20

The reaction was carried out in the same manner as described in Comparative Example 3 except for using 297.6 g of ethylene glycol, 556.8 g of tris(2-hydroxyethyl) isocyanurate, 614.2 g of terephthalic acid, 153.6 g of trimellitic anhydride, 79.2 g of diaminodiphenylmethane, 83.0 g of isophthalic acid, 108.8 g of phenylacetic acid and 210.4 g of meta-cresol. The heating was stopped when the acid value became 18. The resin obtained had an average molecular weight of 1900.

600 Grams of the resin obtained was taken out and 444 g of meta-cresol, 15.7 g of TBT and 5.3 g of zinc naphthenate were added thereto to produce a varnish. Viscosity of the varnish was 49 poise at 30° C. The resin content in the varnish was 47.9% by weight when measured the weight ratio of before and after the heat treatment of the varnish at 200° C for 2 hours.

EXAMPLE 21

To 600 g of the resin obtained in Example 20, 248 g of diethylene glycol monoisopropyl ether, 15.7 g of TBT, and 5.3 g of zinc naphthenate were added to produce a varnish. Viscosity of the varnish was 58 poise at 30° C. The resin content in the varnish was 57.7% by weight when measured the weight ratio of before and after the heat treatment of the varnish at 200° C for 2 hours.

EXAMPLE 22

To 600 g of the resin obtained in Example 20, 107 g of diethylene glycol monoisopropyl ether, 107 g of Cellosolve Acetate, 15.7 g of TBT and 5.3 g of zinc naphthenate were added to produce a varnish. Viscosity of the varnish was 62 poise at 30° C. The resin content in the varnish was 62.6% by weight when measured the weight ratio of before and after the heat treatment of the varnish at 200° C for 2 hours.

EXAMPLE 23

The reaction was carried out in the same manner as described in Comparative Example 3 except for using 182 g of ethylene glycol, 76 g of neopentyl glycol, 71 g of tris(2-hydroxyethyl) isocyanurate, 441 g of terephthalic acid, 48 g of isophthalic acid, 10 g of diaminodiphenylmethane, 46 g of trimellitic anhydride, 180 g of α,β-dimethoxybenzoic acid and 6 g of di-n-butyl tin oxide as a catalyst. The heating was stopped when the acid value became 10. The esterimide resin produced had an average molecular weight of 1900. To the resin, 470 g of Cellosolve Acetate, 48 g of TBT and 15 g of zinc naphthenate were added to produce a varnish. Viscosity of the varnish was 80 poise at 30° C. The resin content in the varnish was 61.7% by weight when measured the weight ratio of before and after the heat treatment of the varnish at 200° C for 2 hours.

EXAMPLE 24

The reaction was carried out in the same manner as described in Comparative Example 3 except for using 187 g of ethylene glycol, 78 g of neopentyl glycol, 238 g of glycerin, 725 g of terephthalic acid, 96 g of diaminodiphenylmethane, 270 g of trimellitic anhydride, 168 g of phenylacetic acid and 5 g of di-n-butyl tin oxide as a catalyst. The heating was stopped when the acid value became 6. The resin produced had an average molecular weight of 2000. To the resin, 370 g of Cellosolve Acetate, 40 g of TBT and 15 g of zinc naphthenate were added to produce a varnish. Viscosity of the varnish was 65 poise at 30° C. The resin content in the varnish was 64.1% by weight when measured the weight ratio of before and after the heat treatment of the varnish at 200° C for 2 hours.

EXAMPLE 25

In a flask equipped with a stirrer, a thermometer, and a cooling tube for fractional distillation, 26.4 g of diaminodiphenylmethane, 51.2 g of trimellitic anhydride and 70.1 g of meta-cresol were placed and 0.6 g of TBT as a catalyst was added to the flask. The flask was heated with a mantle heater to 200° C with stirring, while removing the water generated out of the reaction system. After maintaining the temperature at 200° C for 2 hours, 204.7 g of terephthalic acid, 27.7 g of isophthalic acid, 99.2 g of ethylene glycol, 36.3 g of phenylacetic acid, and 185.6 g of tris(2-hydroxyethyl) isocyanurate were added to the flask. The temperature was raised from 185° C to 230° C in 6 hours with heating, while removing the water generated during the reaction out of the reaction system by distillation. The reaction was continued until the acid value became 11 and the heating was stopped. The resin obtained had an average molecular weight of 1900. To the resin, 440 g of meta-cresol, 15.5 g of TBT, and 4.5 g of zinc naphthenate were added to produce a varnish. Viscosity of the varnish was 62 poise at 30°C. The resin content in the varnish was 47.2% by weight when measured the weight ratio of before and after the heat treatment of the varnish at 200° C for 2 hours.

When the varnishes obtained in Examples 20 - 25 were coated on copper plates and heated at 200° C for 2 hours, there were obtained tough films.

The varnishes obtained in Examples 14 and 20 and Comparative Examples 3 and 4 were coated on copper wires of 1 mm in diameter and baked to produce enamel wires. Physical properties of the enamel wires are as shown in Table 5.

Table 5

| Varnish | Thickness of film (μ) | Flexibility Mandrel test at 20% elongation | | Heat shock 170° C - 1 hr. | | Cut through temperature wt.: 2 kg (° C) | Abrasion resistance wt.: 600 g (times) |
|---|---|---|---|---|---|---|---|
| Comparative Example 3 | 41 | 1X | OK | 1X | OK | 347 | 49 |
| Comparative Example 4 | 40 | 1X | OK | 1X | OK | 300 | 31 |
| Example 14 | 41 | 1X | OK | 1X | OK | 339 | 46 |
| Example 20 | 40 | 1X | OK | 1X | OK | 342 | 48 |

As is clear from Table 5, when the varnish in which the average molecular weight of the resin was lowered in order to increase the resin content in the varnish is used (Comparative Example 4), physical properties of the enamel wire are inferior to those of Comparative Example 3 in cut through temperature and abrasion resistance. On the other hand, when the varnishes according to this invention, in which the monobasic acid containing one or more aromatic rings in the molecule and/or the monohydric alcohol containing one or more aromatic rings in the molecule are used and the resin contents in the varnishes are increased without lowering the molecular weights of the resins, are used, cut through temperature and abrasion resistance are the same as those of Comparative Example 3.

What is claimed is:

1. An electrical insulating resin composition comprising a resin obtained by reacting
   (a) at least one of one or more tri- or higher polydric alcohols and tri- or higher polybasic acids,
   (b) one or more dihydric alcohols, and
   (c) one or more dibasic acids, and at least one of
   (d) one or more monobasic acids containing one or more aromatic rings in the molecule and
   (e) one or more monohydric alcohols containing one or more aromatic rings in the molecule.

2. A composition according to claim 1, wherein the resin is obtained by reacting
   (a) at least one of one or more tri- or higher polyhydric alcohols and tri- or higher polybasic acids,
   (b) one or more dihydric alcohols,
   (c) one or more dibasic acids, and
   (d) one or more monobasic acids containing one or more aromatic rings in the molecule.

3. A composition according to Claim 2, wherein the total alcohols of (a) and (b) are used in 80 equivalent percent or less in terms of the excess percent of the hydroxyl group based on the total carboxylic acids of (a), (c) and (d).

4. A composition according to claim 2, wherein the monobasic acid containing one or more aromatic rings in the molecule is used in 8 - 20 equivalent percent based on the total carboxylic acids of (a), (c) and (d).

5. A composition according to claim 2, wherein the monobasic acid (d) is phenylacetic acid.

6. A composition according to claim 2, wherein the monobasic acid (d) is phenylpropionic acid.

7. A composition according to claim 2, which further comprises an organic solvent.

8. A composition according to claim 7, wherein the organic solvent is at least one of a glycol ether of the formula, $$R_1O(CHR_2CH_2O)_nH \qquad (I)$$

wherein $R_1$ is lower alkyl; $R_2$ is hydrogen or methyl; and n is an integer of 1 to 3, and an alcohol derivative of the formula, $$R_4O(CHR_2CH_2O)_nCOR_3 \qquad (II)$$

wherein $R_3$ and $R_4$ are independently lower alkyl, aryl or aralkyl; and $R_2$ and n are as defined above.

9. A composition according to claim 1, wherein the resin is obtained by reacting
   (a) at least one of one or more tri- or higher polyhydric alcohols and tri- or higher polybasic acids,
   (b) one or more dihydric alcohols,
   (c) one or more dibasic acids, and
   (e) one or more monohydric alcohols containing one or more aromatic rings in the molecule.

10. A composition according to claim 9, wherein the total alcohols of (a), (b) and (e) are used in 50 equivalent percent or less in terms of the excess percent of the hydroxyl group based on the total carboxylic acids of (a) and (c).

11. A composition according to claim 9, wherein the monohydric alcohol containing one or more aromatic rings in the molecule is used in 5 - 30 equivalent percent based on the hydroxyl groups of the total alcohols of (a), (b) and (e).

12. A composition according to claim 9, wherein the monohydric alcohol (e) is benzyl alcohol.

13. A composition according to claim 9, which further comprises an organic solvent.

14. A composition according to claim 13, wherein the organic solvent is at least one of a glycol ether of the formula $$R_1O(CHR_2CH_2O)_nH \qquad (I)$$

wherein $R_1$ is lower alkyl; $R_2$ is hydrogen or methyl; and n is an integer of 1 to 3, and an alcohol derivative of the formula, $$R_4O(CHR_2O)_nCOR_3 \qquad (II)$$

wherein $R_3$ and $R_4$ are independently lower alkyl, aryl or aralkyl; and $R_2$ and n are as defined above.

15. A composition according to claim 1, wherein the resin is obtained by reacting
  (a) at least one of one or more tri- or higher polyhydric alcohols and tri- or higher polybasic acids,
  (b) one or more dihydric alcohols,
  (c) one or more dibasic acids
  (d) one or more monobasic acids containing one or more aromatic rings in the molecule, and
  (e) one or more monohydric alcohols containing one or more aromatic rings in the molecule.

16. A composition according to claim 30, wherein the resin is obtained by reacting
  (a) at least one of one or more tri- or higher polyhydric alcohols and tri- or higher polybasic acids,
  (b) one or more dihydric alcohols,
  (c) one or more dibasic acids,
  (d) one or more monobasic acids containing one or more aromatic rings in the molecule,
  (e) one or more monohydric alcohols containing one or more aromatic rings in the molecule, and
  (f) one or more compounds containing or being able to form one or more 5-membered imide rings.

17. A composition according to claim 30, wherein the resin is obtained by reacting
  (a) at least one of one or more tri- or higher polyhydric alcohols and tri- or higher polybasic acids,
  (b) one or more dihydric alcohols,
  (c) one or more dibasic acids,
  (d) one or more monobasic acids containing one or more aromatic rings in the molecule, and
  (f) one or more compounds containing or being able to form one or more 5-membered imide rings.

18. A composition according to claim 17, wherein the tri- or higher polyhydric alcohol is used in 35 equivalent percent or more based on the total alcohols of (a) and (b).

19. A composition according to claim 17, wherein the compound of (f) is a reaction product of 2 moles of trimellitic anhydride and 1 mole of a primary diamine.

20. A composition according to claim 17, which further comprises an organic solvent.

21. A composition according to claim 20, wherein the organic solvent is at least one of a glycol ether of the formula,

wherein $R_1$ is lower alkyl; $R_2$ is hydrogen or methyl; and n is an integer of 1 to 3, and an alcohol derivative of the formula,

wherein $R_3$ and $R_4$ are independently lower alkyl, aryl or aralkyl; and $R_2$ and n are as defined above.

22. A composition according to claim 17, wherein the monobasic acid containing one or more aromatic rings in the molecule is used in 8 - 20 equivalent percent based on the total carboxylic acids of (a), (c) and (d).

23. A composition according to claim 30, wherein the resin is obtained by reacting
  (a) at least one of one or more tri- or higher polyhydric alcohols and tri- or higher polybasic acids,
  (b) one or more dihydric alcohols,
  (c) one or more dibasic acids,
  (e) one or more monohydric alcohols containing one or more aromatic rings in the molecule, and
  (f) one or more compounds containing or being able to form one or more 5-membered imide rings.

24. A composition according to claim 23, wherein the tri- or higher polyhydric alcohol is used in 35 equivalent percent or more based on the total alcohols of (a), (b) and (e).

25. A composition according to claim 23, wherein the monohydric alcohol containing one or more aromatic ring in the molecule is used in 5 - 30 equivalent percent based on the total alcohols of (a), (b) and (e).

26. A composition according to claim 23, which further comprises an organic solvent.

27. A composition according to claim 26, wherein the organic solvent is at least one of a glycol ether of the formula,

wherein $R_1$ is lower alkyl; $R_2$ is hydrogen or methyl; and n is an integer of 1 to 3, and an alcohol derivative of the formula,

wherein $R_3$ and $R_4$ are independently lower alkyl, aryl or aralkyl; and $R_2$ and n are as defined above.

28. A composition according to claim 23, wherein the compound of (f) is a reaction product of 2 moles of trimellitic anhydride and 1 mole of a primary diamine.

29. A composition according to claim 1, wherein the tri- or higher polyhydric alcohol is tris(2-hydroxyethyl) isocyanurate.

30. A composition according to claim 1, wherein the resin is obtained by reacting, in addition to (a), (b), and (c), and at least one of (d) and (e),
  (f) one or more compounds containing or being able to form one or more 5-membered imide rings.

31. A composition according to claim 1, wherein the tri- or higher polyhydric alcohols are selected from the group consisting of trimethylolpropane, glycerin, and tris(2-hydroxyethyl) isocyanurate.

32. A composition according to claim 31, wherein the tri- or higher polybasic acids are selected from the group consisting of trimellitic anhydride, pyromellitic anhydride, and trimethylester of trimellitic anhydride.

33. A composition according to claim 32, wherein the dihydric alcohols are selected from the group consisting of ethylene glycol, propylene glycol, and neopentyl glycol.

34. A composition according to claim 33, wherein the dibasic acids are selected from the group consisting of terephthalic acid, isophthalic acid, phthalic anhydride, dimethyl terephthalate, and dimethyl isophthalate.

35. A composition according to claim 34, wherein the monohydric alcohols containing one or more aromatic rings in the molecule are selected from the group consisting of benzyl alcohol and phenylethyl alcohol.

36. A composition according to claim 35, wherein the monobasic acids containing one or more aromatic rings in the molecule are selected from the group consisting of benzoic acid, 2,3-dimethoxybenzoic acid, p-toluic acid, phenoxyacetic acid, 2-phenoxypropionic acid, phenylacetic acid, phenylpropionic acid, p-toluyl-o-benzoic acid, α-naphthylacetic acid, β-naphthoxyacetic acid, and methyl benzoate.

37. A composition according to claim 30, wherein the compounds containing or being able to form one or more 5-membered imide rings are a reaction product of a polybasic acid anhydride with one of the members of the group consisting of a primary diamine, an amino alcohol and an aminocarboxylic acid.

38. A composition according to claim 37, wherein the polybasic acid anhydride is selected from the group consisting of trimellitic anhydride and pyromellitic anhydride, the primary diamine is selected from the group consisting of diaminodiphenylmethane and metaphenylenediamine, the amino alcohol is ethanolamine, and the aminocarboxylic acid is selected from the group consisting of aminoacetic acid and aminohexanoic acid.

39. A composition according to claim 2, wherein the resin is obtained by reacting materials consisting essentially of (a), (b), and (c) and (d).

40. A composition according to claim 9, wherein the resin is obtained by reacting materials consisting essentially of (a), (b), (c) and (e).

41. A composition according to claim 15, wherein the resin is obtained by reacting materials consisting essentially of (a), (b), (c), (d) and (e).

42. A composition according to claim 16, wherein the resin is obtained by reacting materials consisting essentially of (a), (b), (c), (d), (e), and (f).

43. A composition according to claim 17, wherein the resin is obtained by reacting materials consisting essentially of (a), (b), (c), (d) and (f).

44. A composition according to claim 23, wherein the resin is obtained by reacting materials consisting essentially of (a), (b), (c), (e) and (f).

45. A composition according to claim 1, wherein the monobasic acids and monohydric alcohols do not contain amino groups which react to form an imide ring.

46. A composition according to claim 30, wherein the monobasic acids and monohydric alcohols do not contain amino groups which react to form an imide ring.